United States Patent
Moorkanat et al.

(10) Patent No.: US 9,412,079 B2
(45) Date of Patent: Aug. 9, 2016

(54) SYSTEM AND METHOD OF SCENARIO VERSIONING

(75) Inventors: Jayan Moorkanat, Bangalore (IN); Deb Kalyan Mohanty, Bangalore (IN); Bhanu Gotluru, Bangalore (IN); Gayathri Chennimalai, Bangalore (IN); Nitin Singal, Bangalore (IN)

(73) Assignee: JDA Software Group, Inc., Scottsdale, AZ (US)

( * ) Notice: Subject to any disclaimer, the term of this patent is extended or adjusted under 35 U.S.C. 154(b) by 586 days.

(21) Appl. No.: 12/612,114

(22) Filed: Nov. 4, 2009

(65) Prior Publication Data

US 2010/0121683 A1 May 13, 2010

Related U.S. Application Data

(60) Provisional application No. 61/112,224, filed on Nov. 7, 2008.

(51) Int. Cl.
G06F 17/30 (2006.01)
G06Q 10/06 (2012.01)

(52) U.S. Cl.
CPC .............. *G06Q 10/06* (2013.01); *G06Q 10/063* (2013.01)

(58) Field of Classification Search
None
See application file for complete search history.

(56) References Cited

U.S. PATENT DOCUMENTS

| | | | |
|---|---|---|---|
| 4,606,002 A * | 8/1986 | Waisman .......... G06F 17/30327 |
| 6,018,741 A * | 1/2000 | Howland et al. ............. 707/696 |
| 2005/0004831 A1* | 1/2005 | Najmi et al. .................... 705/10 |
| 2008/0222129 A1* | 9/2008 | Komatsu et al. ................. 707/5 |
| 2008/0243570 A1* | 10/2008 | Moorkanat et al. ............... 705/7 |

FOREIGN PATENT DOCUMENTS

| TW | 200701100 | 1/2007 |
|---|---|---|
| TW | I311289 | 6/2009 |
| TW | I360057 | 3/2012 |
| TW | I433039 | 4/2014 |

OTHER PUBLICATIONS

Search Report for Taiwan Invention Patent Application No. 098137844; Nov. 12, 2014; p. 1.

\* cited by examiner

*Primary Examiner* — Tyler Torgrimson
(74) *Attorney, Agent, or Firm* — Jackson White, PC; Steven J. Laureanti

(57) ABSTRACT

A system and method is disclosed for scenario management. The system includes a database configured to store data describing a plurality of scenarios, each scenario comprising one or more fields and data describing the supply chain network comprising a plurality of network components, each network component configured to supply one or more items to satisfy demand. The system further includes a server coupled with the database; the server accesses the data describing the plurality of scenarios and accesses the data describing the supply chain network. The server further traverses the one or more fields of the plurality of scenarios until a value is determined and stores the determined value in the database for each of the one or more fields of the plurality of scenarios.

15 Claims, 2 Drawing Sheets

SYSTEM AND METHOD OF SCENARIO VERSIONING

CROSS-REFERENCE TO RELATED APPLICATIONS

The present invention is related to that disclosed in U.S. Provisional Patent Application Ser. No. 61/112,224, filed 7 Nov. 2008, entitled "Scenario Versioning and Data Storing Mechanism for Fast Scenario Creation and Planning in a Memory and Performance Efficient Manner for Sales and Operations Management." U.S. Provisional Patent Application Ser. No. 61/112,224 is assigned to the assignee of the present application. The subject matter disclosed in U.S. Provisional Patent Application Ser. No. 61/112,224 is hereby incorporated by reference into the present disclosure as if fully set forth herein. The present invention hereby claims priority under 35 U.S.C. §119(e) to U.S. Provisional Patent Application Ser. No. 61/112,224.

TECHNICAL FIELD OF THE INVENTION

This invention relates generally to scenario management, and more particularly to system and method of scenario versioning.

BACKGROUND OF THE INVENTION

In a sales and operations management framework, supply chain entities attempt to simulate different scenarios with varying inputs and check the costs and plan quality associated with those scenarios before, for example, freezing the inputs. That is, a user may wish to check out the effect of increasing capacity in a resource's bucket, adding a new demand, or the like. However, in traditional scenario management products, which run other products, such as, for example, a master planner at the backend, the scenario management product copies the full data into memory, for each scenario, and makes the necessary changes pertaining to that scenario and calls the product at the back end. The disadvantage of this approach is that every scenario is a copy of the full data and this is inefficient from the perspective of both memory and computational performance and places limitations on the number of scenarios that an entity is able to run and is undesirable.

SUMMARY OF THE INVENTION

A system for scenario management is disclosed. The system includes a database configured to store data describing a plurality of scenarios, each scenario comprising one or more fields and data describing the supply chain network comprising a plurality of network components, each network component configured to supply one or more items to satisfy demand. The system further includes a server coupled with the database; the server accesses the data describing the plurality of scenarios and accesses the data describing the supply chain network. The server further traverses the one or more fields of the plurality of scenarios until a value is determined and stores the determined value in the database for each of the one or more fields of the plurality of scenarios.

A method of scenario management is also disclosed. The method provides for accessing data describing a plurality of scenarios, each scenario comprising one or more fields and accessing data describing the supply chain network comprising a plurality of network components, each network component configured to supply one or more items to satisfy demand. The method further provides for traversing the one or more fields of the plurality of scenarios until a value is determined and storing the determined value in the database for each of the one or more fields of the plurality of scenarios.

Software for scenario management is also disclosed. The software is configured to access data describing a plurality of scenarios, each scenario comprising one or more fields and data describing the supply chain network comprising a plurality of network components, each network component configured to supply one or more items to satisfy demand. The software is further configured to traverse the one or more fields of the plurality of scenarios until a value is determined and store the determined value in the database for each of the one or more fields of the plurality of scenarios.

BRIEF DESCRIPTION OF THE DRAWINGS

The novel features believed characteristic of the invention are set forth in the appended claims. However, the invention itself, as well as a preferred mode of use, and further objectives and advantages thereof, will best be understood by reference to the following detailed description when read in conjunction with the accompanying drawings, wherein:

DETAILED DESCRIPTION OF THE INVENTION

Reference will now be made to the following detailed description of the preferred and alternate embodiments. Those skilled in the art will recognize that the present invention provides many inventive concepts and novel features, that are merely illustrative, and are not to be construed as restrictive. Accordingly, the specific embodiments discussed herein are given by way of example and do not limit the scope of the present invention.

Figure 1:
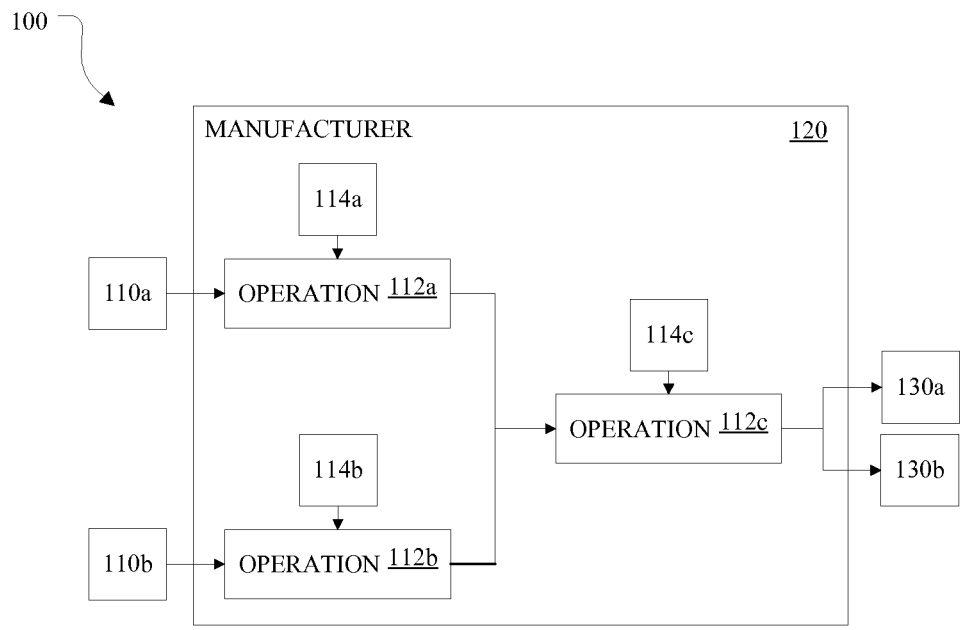
FIG. 1 illustrates an exemplary system according to a preferred embodiment.

FIG. 1 illustrates an exemplary supply chain network 100 according to a preferred embodiment. Supply chain network 100 comprises suppliers 110a and 110b, a manufacturer 120, and customers 130a-130b. Manufacturer 120 comprises supply chain entities, such as, for example, operations 112a-112c and resources 114a-114c. Although supply chain network 100 is shown and described as comprising particular supply chain entities including a particular supply chain path, embodiments contemplate any suitable supply chain network, entities, paths, or combination of networks, entities, and paths, according to particular needs.

In one embodiment, supply chain network 100 may describe the flow of items such as, for example, materials and products through one or more supply chain entities. Items may include, for example, raw material, supplies, components, intermediate products, and/or finished products. Operations 112a-112c represent one or more entities, structures, buffers, or apparatuses configured to receive one or more items from suppliers 110a and 110b and perform at least one operation to transform the items to satisfy one or more customer demands. In a particular embodiment, suppliers 302 and 306 provide items to operations 112a-112c; and operations 112a-112c consume items and resources 114a-114c to transform the items to satisfy one or more customer demands. Each customer demand may be represented as a demand request for a quantity of items required by one of any number of customers 130a-130b on or by a due date.

In an embodiment, one or more users may be associated with supply chain network 100. These one or more users may include, for example, a "planner" handling master planning, order planning and/or one or more related tasks within supply chain network 100. In addition, or as an alternative, these one or more users may include, for example, one or more computers programmed to autonomously handle master planning, order planning and/or one or more related tasks within supply chain network 100.

Figure 2:
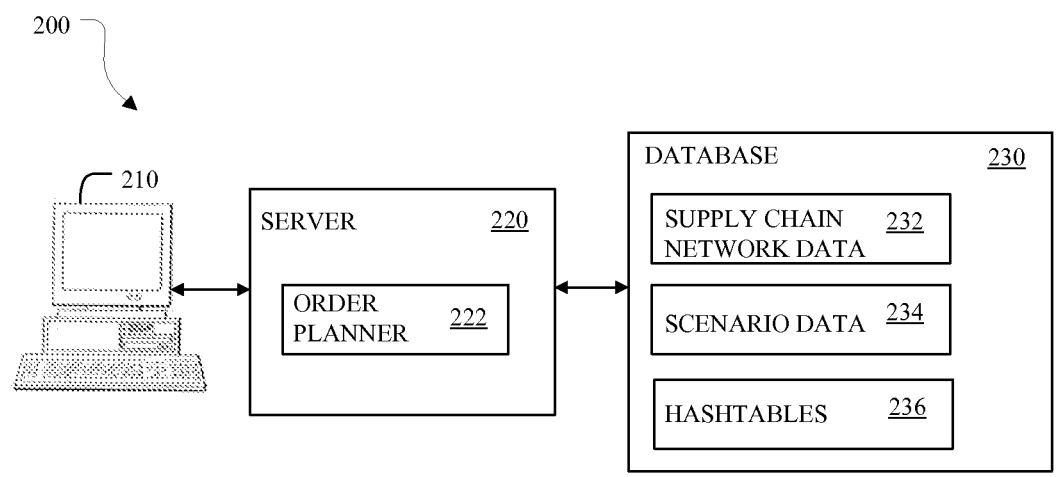
FIG. 2 illustrates an exemplary scenario management system in accordance with the preferred embodiment.

FIG. 2 illustrates exemplary scenario management system 200 in accordance with the preferred embodiment. System 200 comprises a computer 210, a server 220, and a database 230. System 200 may be coupled with one or more supply chain entities of supply chain network 100 using one or more local area networks (LANs), metropolitan area networks (MANs), wide area networks (WANs), such as, for example, the Internet, or any other appropriate wire line, wireless, or other links. Although a single computer 210, a single server 220, and a single database 230, are shown and described; embodiments contemplate any number of computers, any number of servers, and/or any number of databases, according to particular needs. In addition, or as an alternative, system 100 may be integral to or separate from the hardware and/or software of any one of the one or more supply chains entities of FIG. 1.

In one embodiment, computer 210 includes any suitable input device, such as a keypad, mouse, touch screen, microphone, or other device to input information. An output device conveys information associated with the operation of supply chain network 100 and one or more entities, including digital or analog data, visual information, or audio information. Computer 210 includes fixed or removable computer-readable storage media, such as, for example, magnetic computer disks, CD-ROM, or other suitable media to receive output from and provide input to system 200. Computer 210 includes one or more processors and associated memory to execute instructions and manipulate information according to the operation of system 200.

Although a single computer 210 is shown in FIG. 2, system 200 may operate on separate computers 210 or may operate on one or more shared computers 210. Each of these one or more computers 210 may be a work station, personal computer (PC), network computer, notebook computer, personal digital assistant (PDA), cell phone, telephone, wireless data port, or any other suitable computing device.

In one embodiment, the memory associated with one or more computers 210 comprises any of a variety of data structures, arrangements, and/or compilations configured to store and facilitate retrieval of information. The memory may, for example, comprise one or more volatile or non-volatile memory devices. Although the memory is described as residing within one or more computers 210, the memory may reside in any location or locations that are accessible by one or more computers 210 or the one or more processors. The memory receives and stores information related to scenarios associated with, for example, supply chain network 100. The one or more processors processes information stored in the memory and generates and accesses a scenario tree and hashtable associated with supply chain network 100. The memory may store and the one or more processors may process any suitable information to perform scenario management or other planning operations in, for example, supply chain network 100.

Server 220 manages applications that generate and access scenario trees and hashtables associated with supply chain network 100. Server 220 comprises an order planner 222. Order planner 222 generates a hashtable for storing incremental changes in one or more scenarios. That is, the incremental changes are only those changes made on the scenario with respect to its immediate parent and not the sum total of changes between the scenario and the base scenario, as discussed below in more detail. In one embodiment, the incremental changes are made by a user associated with supply chain planner 110. In addition, or as an alternative, incremental changes are planning related, that is, new operation plans, buffer on hand profile changes, and other like changes. Although server 220 is shown and described as comprising a single order planner 222, embodiments contemplate any suitable engine, planner, or combination of engines and planners, according to particular needs.

Database 230 comprises one or more databases or other data storage arrangements at one or more locations, local to, or remote from, server 220. Database 230 may be coupled with server 220 using one or more local area networks (LANs), metropolitan area networks (MANs), wide area networks (WANs), such as, for example, the Internet, or any other appropriate wire line, wireless, or other links. Database 230 stores data that may be used by server 220. Database 220 includes, for example, supply chain network data 232, scenario data 234, and hashtables 236. Supply chain network data 232 describes supply chain network 100, and may describe the various supply chain entities of supply chain network 100.

Scenario data 232 describes a scenario tree, wherein every node in the scenario tree represents a scenario associated with supply chain network 100 and includes one or more specific fields, which may include a value. For example, each scenario may hold only that information (value) which is different from its immediate parent scenario. In addition, or as an alternative, each scenario comprises information about its parent (i.e., the scenario from which the scenario was derived) as well as information about its child scenarios (i.e., scenarios derived from the scenario). In addition, the root node of the scenario tree is the base scenario which comprises the complete data set (i.e., a value of a specific field for a given scenario) and the parent scenario of a scenario node is the parent node of that node in the scenario tree structure.

Server 220 generates one or more hashtables 236 for each scenario tree, wherein the key is the given scenario and the value is the entry for the given scenario. Although database 230 is shown and described as including supply chain network data 232, scenario data 234, and hashtables 236, embodiments contemplate any suitable information or data, according to particular needs.

As an example only, and not by way of limitation, consider the following set of scenario-ised data:
  Lotsizes on operations
  Demand quantity for a given order
In this example, the scenario tree stored in scenario data 234 is as follows: the base scenario is S0; S0 has three child scenarios S1, S2 and S3; and S2 has two child scenarios S21 and S22. In addition, in this example, the data consists of lotsizes of operation and demand quantities for order. Although a particular scenario tree and data is shown and described, embodiments contemplate any suitable scenario tree or data, without departing from the scope of the present invention. Continuing with this example, TABLE 1 illustrates the associated values of the exemplary fields for each of the scenarios:

TABLE 1

| Scenario | Lotsizes of Operation | Demand Quantities for Order |
|---|---|---|
| S0 | 100 | 50 |
| S1 | 50 | 50 |
| S2 | 100 | 150 |
| S3 | 120 | 250 |
| S21 | 100 | 150 |
| S22 | 180 | 50 |

However, as discussed above, order planner 222 only stores the information (values) which are different from the scenarios immediate parent scenario, except for, the base scenario which comprises the complete data set. Therefore, order planner 222 stores the following data in each scenario, as shown in TABLE 2:

TABLE 2

| Scenario | Lotsizes of Operation | Demand Quantities for Order |
|---|---|---|
| S0 | 100 | 50 |
| S1 | 50 | |
| S2 | | 150 |
| S3 | 120 | 250 |
| S21 | | |
| S22 | 180 | 50 |

As shown above in TABLE 2, order planner 222 does not store demand quantity for order in S1, because the value is not changed with respect to parent scenario S0. Similarly order planner 222 does not store lotsizes of operations in S2, because the value is the same with respect to parent scenario S0. However, order planner 222 stores both the values for lotsizes of operations and demand quantity for order in scenario S3, because both values are changed with respect to parent scenario S0. Order planner 222 does not store any values in either lotsizes of operations and demand quantity for order in scenario S21, because the respective field values are identical to that of parent scenario S2. However, order planner 222 stores both the values for lotsizes of operations and demand quantity for order in scenario S21, because both respective field values are different from those of parent scenario S2. Although a particular example is shown and described, embodiments contemplate any scenario-ised set of data, without departing from the scope of the present invention.

Figure 3:
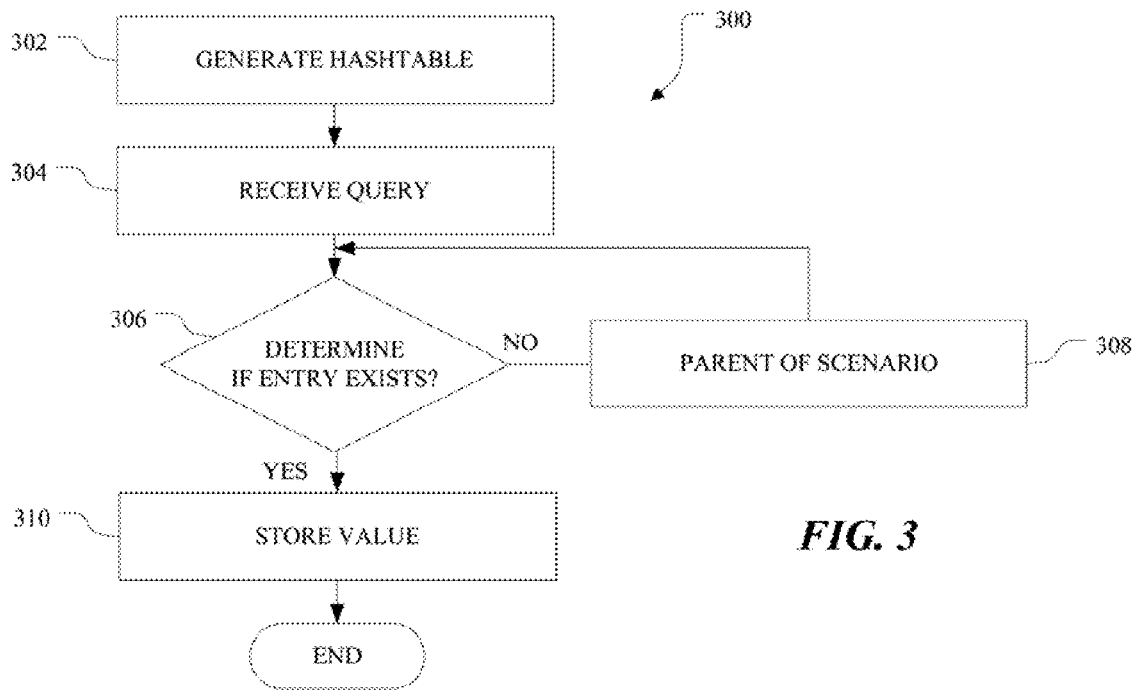
FIG. 3 illustrates an exemplary method of accessing incremental changes in a scenario.

FIG. 3 illustrates an exemplary method 300 of accessing incremental changes in a scenario. The method begins at step 302, where order solver 222 generates a hashtable 236 for storing incremental changes in a scenario. That is, the incremental changes are only those changes made on the scenario with respect to its immediate parent and not the sum total of changes between the scenario and the base scenario. In addition, the generated hashtable 236 is initially generated with empty hashtables, since no incremental data exists.

At step 304, order planner 222 receives a query of a specified field for a given scenario from a user associated with supply chain network 100. At step 306, order planner 110 determines if an entry for that field exists. If there is an entry for that field, then the method proceeds to step 310, otherwise, the method proceeds to step 308. If there is not an entry for that field, then the parent scenario of the scenario is checked and so on until an entry for that field is encountered, at step 308. In addition, as discussed above, the base scenario contains an entry for all fields. Therefore, once an entry is encountered for that field, even if at the base scenario, than the value is stored in hashtable 236 of database 230 at step 310 and the method ends.

As an example only, and not by way of limitation, each operation stores a hashtable of lotsizes keyed over scenarios, for each of operation lotsizes. In such a case, order planner 222 accesses an operation's lotsize in a given scenario and determines if an entry exists for this scenario in the lotsizes hashtable. If such an entry exists for this scenario in the lotsizes hashtable, order planner 222 returns that entry (i.e., value) as the operation's lotsize in the given scenario. Otherwise, order planner 222 determines if the given scenario's parent scenario has an entry in this hashtable. In addition, the traversal up the scenario tree (along the parent scenario recursively) continues until an entry is found in the lotsizes hashtable for that scenario. This entry value is then returned as the operation's lotsize in the given scenario and the method ends.

In another embodiment, each buffer stores a hashtable of on hand profiles keyed over scenarios, similar to the above-discussed case of operation lotsizes, in order to represent more complex fields like buffer's on hand profile. In addition, although, FIG. 3 illustrates one embodiment of a method of accessing incremental changes in a scenario in a supply chain network, various changes may be made to method 300 without departing from the scope of embodiments of the present invention.

Figure 4:
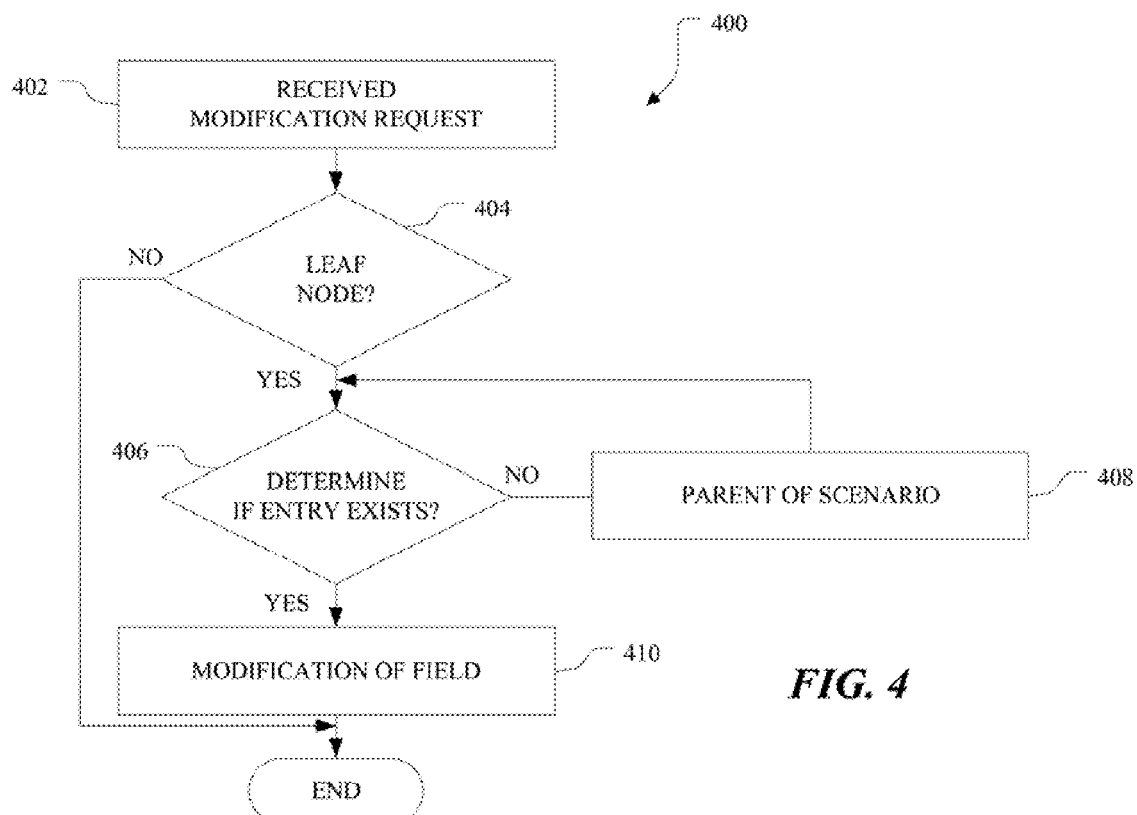
FIG. 4 illustrates an exemplary method of modifying fields in a given scenario.

FIG. 4 illustrates an exemplary method 400 of modifying fields in a given scenario. Order planner 222 begins the method at step 402 by receiving a request to modify a field in a given scenario from a user associated with supply chain network 100. At step 404, order planner 110 determines if the received data modification is allowed. A data modification for any field in a given scenario may be allowed only if that scenario is, for example, a leaf node (i.e., the scenario does not have a child scenario).

At step 406, order planner 222 determines if an entry for the given scenario exists. If there is an entry for the scenario, then the method proceeds to step 410, otherwise, the method proceeds to step 408. If there is not an entry for that field, order planner 222 traverses the scenario tree along the parent scenario recursively, at step 408, until an entry for that field is encountered. If there is an entry for that field or once an entry is encountered for that field, even if at the base scenario, than the value is modified in hashtable 236 of database 230 at step 410 and the method ends. In addition, the modification performed does not affect the values stored in any other scenario in the scenario tree, since there are no child scenarios for the given scenario.

As an example only, and not by way of limitation, order planner 222 determines if, for example, the on hand profile hashtable has an entry for the given scenario. If there is not an entry for that field, order planner 222 traverses the scenario tree to obtain the on hand profile. In addition or as an alternative, a deep copy of this on hand profile is then generated and the necessary on hand modification made on it and this is then added to the hashtable keyed on the given scenario. If there is an entry for that field in the on hand profile hashtable, then order planner 222 modifies the value. As discussed above, the modification performed does not affect the values stored in any other scenario in the scenario tree.

In addition, or as an alternative, if multiple scenarios are created, order planner 222 may combine or merge changes in multiple scenarios into one single scenario. For example, since the changes are stored, in for example, isolation, then these changes can be collected together and applied at one shot on a new scenario, which can act as the combined or merged scenario.

In addition, order planner 222 may freeze a scenario, such that, no modifications can be made to any data in that scenario. For example, in the above data structure, order planner 222 may determine if a scenario is frozen before allowing any modification. That is, child scenario may be allowed to be created only on a 'frozen' scenario, since, for example, data modifications are not allowed if a scenario has child scenarios derived from it.

In another embodiment, order planner 222 may disallow lotsizes of specific operations from being modified in any scenario. For example, order planner 222 may lock the lotsizes hashtable for those operations, so that no entry is allowed to be made into those hashtables. In addition, although, FIG. 4 illustrates one embodiment of a method of modifying fields in a given scenario in a supply chain network, various changes may be made to method 400 without departing from the scope of embodiments of the present invention.

Reference in the foregoing specification to "one embodiment", "an embodiment", or "another embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. A supply chain planning system, comprising:
   a supply chain network comprising two or more network components, each network component supplies one or more items to satisfy demand;
   a database comprising data describing the supply chain network; and
   a computer coupled with the database and comprising one or more processors and one or more memory units to execute instructions to:
   store data describing two or more scenarios, each scenario comprising one or more fields, each field comprising a value only when the value is different than the value in a corresponding field of each respective parent scenario;
   access the data describing the two or more scenarios;
   access the data describing the supply chain network;
   permit a modification of a scenario only when the scenario to be modified does not have a child scenario;
   determine if a scenario comprises an entry for a field and when there is not an entry for the field, traverse a scenario tree along a parent scenario recursively, until an entry for the field is encountered and modify the value of the field;
   traverse the one or more fields of the two or more scenarios until a value is determined wherein values from a field in a scenario that is not different from the value in the corresponding field in the parent scenario are retrieved from the parent scenario; and
   store the determined value in the database for each of the one or more fields of the two or more scenarios.

2. The system of claim 1, wherein the two or more scenarios are in a hierarchy of scenarios.

3. The system of claim 2, wherein the two or more scenarios comprises a base scenario comprising a value for each of the one or more fields.

4. The system of claim 2, wherein the one or more fields of each of the two or more scenarios comprises a value only when the value is different than the value in the one or more fields of the parent scenario.

5. The system of claim 1, wherein the scenario tree comprises one or more nodes representing a scenario of the supply chain network.

6. A computer-implemented method, comprising:
   storing data describing two or more scenarios, each scenario comprising one or more fields, each field comprising a value only when the value is different than the value in a corresponding field of each respective parent scenario;
   accessing data describing a supply chain network comprising two or more network components, each network component supplies one or more items to satisfy demand;
   modifying a scenario only when the scenario to be modified does not have a child scenario;
   determining if a scenario comprises an entry for a field when there is not an entry for the field, traversing a scenario tree along a parent scenario recursively, until an entry for the field is encountered and modifying the value of the field;
   traversing the one or more fields of the two or more scenarios until a value is determined wherein values from a field in a scenario that is not different from the value in the corresponding field in the parent scenario are retrieved from the parent scenario; and
   storing the determined value in the database for each of the one or more fields of the two or more scenarios.

7. The computer-implemented method of claim 6, wherein the two or more scenarios are in a hierarchy of scenarios.

8. The computer-implemented method of claim 7, wherein the two or more scenarios comprises a base scenario comprising a value for each of the one or more fields.

9. The computer-implemented method of claim 7, wherein the one or more fields of each of the two or more scenarios comprises a value only when the value is different than the value in the one or more fields of the parent scenario.

10. The computer-implemented method of claim 6, further comprising:
    accessing the scenario tree comprising one or more nodes representing a scenario of the supply chain network.

11. A non-transitory computer-readable storage medium embodied with software, the software when executed using one or more computers:
    stores data describing two or more scenarios, each scenario comprising one or more fields, each field comprising a value only when the value is different than the value in a corresponding field of each respective parent scenario;
    accesses data describing a supply chain network comprising two or more network components, each network component supplies one or more items to satisfy demand;
    modify a scenario only when the scenario to be modified does not have a child scenario;
    determine if a scenario comprises an entry for a field when there is not an entry for the field, traverse a scenario tree along a parent scenario recursively, until an entry for the field is encountered and modifying the value of the field;
    traverses the one or more fields of the two or more scenarios until a value is determined wherein values from a field in a scenario that is not different from the value in the corresponding field in the parent scenario are retrieved from the parent scenario; and
    stores the determined value in the database for each of the one or more fields of the two or more scenarios.

12. The non-transitory computer-readable storage medium of claim 11, wherein the two or more scenarios are in a hierarchy of scenarios.

13. The non-transitory computer-readable storage medium of claim 12, wherein the two or more scenarios comprises a base scenario comprising a value for each of the one or more fields.

14. The non-transitory computer-readable storage medium of claim 12, wherein the one or more fields of each of the two or more scenarios comprises a value only when the value is different than the value in the one or more fields of the parent scenario.

15. The non-transitory computer-readable storage medium of claim 11, wherein the software further:
   accesses the scenario tree comprising one or more nodes representing a scenario of the supply chain network.

\* \* \* \* \*